July 16, 1929.  O. ZERK, NOW BY JUDICIAL CHANGE OF NAME O. U. ZERK  1,720,873
LUBRICANT COMPRESSOR
Filed Aug. 2, 1923    2 Sheets-Sheet 1
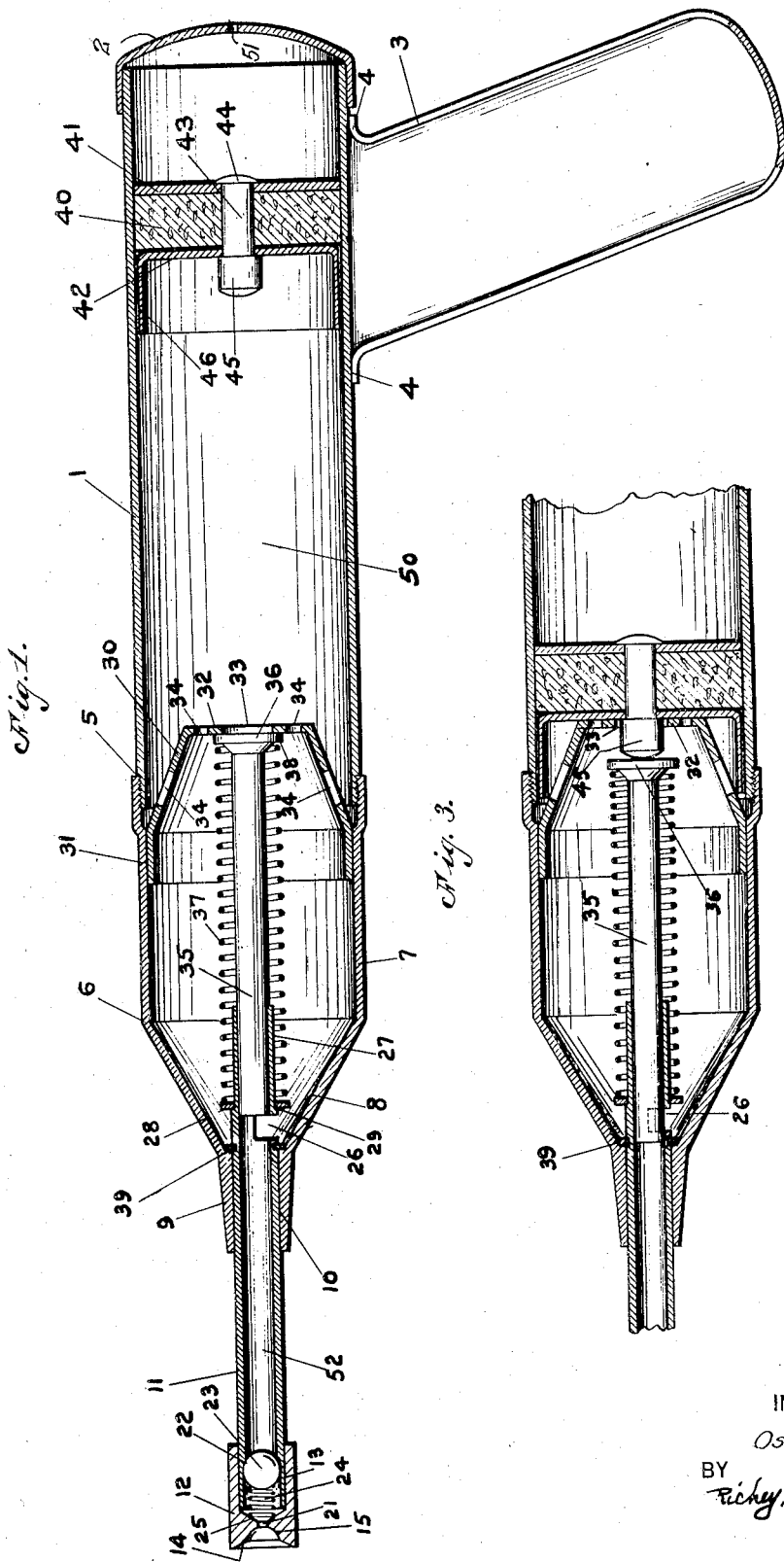
INVENTOR
OSCAR ULYSSES ZERK
BY
Richey, Slough & Watts
ATTORNEY

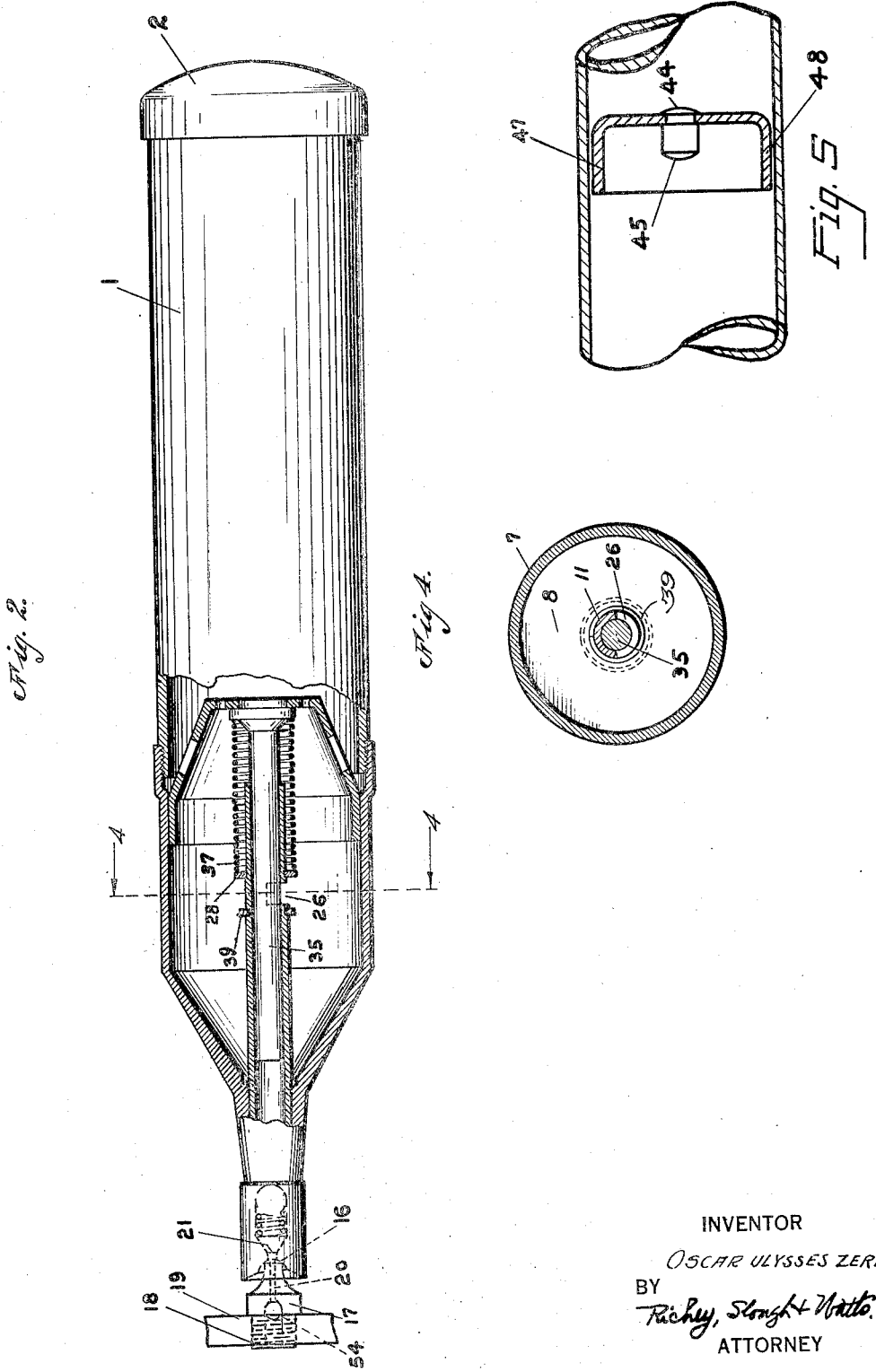

Patented July 16, 1929.

1,720,873

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE ALEMITE MANUFACTURING CORPORATION, OF CHICAGO, ILLINOIS, A CORPORATION OF DELAWARE.

LUBRICANT COMPRESSOR.

Application filed August 2, 1923. Serial No. 655,292.

My invention relates to lubricant compressors, and more particularly to compressors containing a reservoir for lubricant, which may be oil or grease or like material, together with apparatus comprised therewith, serving to forcibly eject a charge of the contained lubricant from the compressor at a high hydraulic pressure, such compressors being especially applicable to the lubrication of the bearings of machinery such as the bearings of an automobile, the lubricant from the compressor being discharged into lubricant receiving nipples permanently mounted adjacent such bearings on the machine.

It is an object of my present invention to provide an improved lubricant compressor of the above general type, which will comprise a minimum of operating parts and which, when put into operation, will be highly efficient.

Another object of my invention is to provide a compressor of the above character, in which the lubricant reservoir may be so disassociated from the lubricant-ejecting mechanism that such reservoir may be very simply recharged by loading from the muzzle end of the reservoir.

Another object of my invention is to provide certain features of improvement whereby at each and every equal discharge operation a substantially equal charge of lubricant will be ejected at high pressure from the compressor, without the inclusion of air in the lubricant, which would otherwise cause faulty and irregular operation.

Another object of my invention is to provide, in a compressor of the above character, a construction wherein the lubricant is fed into a discharge chamber separate from the lubricant reservoir after each discharge operation, by the effect of a suction created in such discharge chamber after such operation.

Other objects of my invention and the invention itself will be apparent from the description of a specific embodiment of my invention, in which description reference is had to the accompanying drawings illustrating such embodiment, in which drawings:

Figure 1 shows a vertical, longitudinal, medial, sectional view of a lubricant compressor embodying the principles of my invention, the parts being in non-lubricant discharging position.

Figure 2 shows a top plan view of the compressor illustrated in Figure 1, a portion thereof being shown as broken away so as to expose certain of the inner operating parts, some of which are shown in plan, and others as a longitudinal medial sectional view; in this figure the operating parts exposed are shown in the positions they assume at the end of a lubricant discharging operation.

Figure 3 shows a longitudinal, medial, sectional view of certain of the operating parts of the compressor in the positions they assume when the supply of lubricant in the lubricant reservoir has become depleted and the lubricant reservoir requires recharging.

Figure 4 is a section taken on the line 4—4, as indicated in Figure 2, of the lubricant compressor embodiment of the foregoing figures, looking toward the forward or nozzle end of the compressor.

Figure 5 shows a modified form of piston which I may employ in connection with the lubricant compressor of my invention in longitudinal, medial, sectional view.

Referring now to all of the drawings, in all of which like parts are indicated by like reference characters;

At 1 I show a cylindrical lubricant containing reservoir, or barrel, having a cover 2 at its rear or breech end and a handle 3 rigidly secured to the barrel 1, as at points 4, as by electric welding or any other suitable well known way. The barrel has its forward or muzzle end threaded externally as shown at 5, over which threads a head 6 is adapted to be screw-threaded so as to rigidly secure the head 6 to the barrel 1. The head 6 comprises preferably a cylindrical portion 7 and a tapered end 8, together with a bearing portion 9, the bearing portion 9 being of reduced diameter and containing a cylindrical bore 10, which is disposed in axial alinement, preferably, with the reservoir barrel 1.

Within the bore 10 a cylindrical tube 11 is adapted to telescope, the external cylindrical walls of the tube making a close fit with the internal cylindrical walls of the bore 10. At the end of the tube 11 a nozzle 12 is rigidly affixed, as by driving the nozzle 12 onto the end of the tube 11, the end of the tube making a tight driving fit within the cylindrical walls 13 of the nozzle; the nozzle is recessed at its front and rear portions, the rear recess containing the cylindrical walls 13 and the forward recess containing the outer flared guiding walls 14 and a spherical contact face 15.

The spherical contact face 15 is adapted to be engaged by the circular rim 16 of a bearing receiving nipple 17, screw-threaded by its stem 18 into the frame 19 adjacent a machine bearing, the nipple containing a passageway 20 leading from the bearing surfaces to the center of the contact face within the rim 16, and communicating with the nozzle orifice 21 of the compressor. The tube 11 has its forward end, fitting within the cylindrical nozzle walls 13, of increased internal diameter, so as to provide a valve seat 22 for a check valve ball 23, spring pressed against such seat by a spiral spring 24, bearing against the valve ball and seating against the end wall 25 of the nozzle recess.

The tube 11 projects within the head 6 and contains therein a port 26 and a plunger guide portion 27, the said plunger guide portion extending beyond the port 26 toward the interior of the compressor. The guide portion 27 carries a washer 28 seated against a shoulder 29 which results from the making of the end of the guide portion 27 of slightly reduced external diameter. A metallic bridge 30 is rigidly secured to the head 6 as by making it a tight driving fit within the portion 31 of the head, or by electrically welding it to such portion, or in any other well known suitable way, and is preferably substantially cup-shaped, its bottom wall 32 being perforated at 33 and elsewhere, as shown variously at 34.

At 35 I show a piston, or plunger comprising a relatively long cylindrical rod and a rear enlarged head or flanged portion 36, the end of the head 36 being adapted to seat on the bottom wall 32 of the bridge 30, the head 36 being of larger diameter than the diameter of the opening 33 through such bottom wall.

A helical compression spring 37 is disposed between the inner face 38 of the flanged end 36 of the plunger 35 and the washer 28, which is carried upon the guide portion 27 of the telescoping tube 11. The spring 37 serves to exert a separating pressure on the plunger and the tube, so as to tend to keep them in extended positions, as shown in Figure 1, and to retract them to such positions after a discharging operation, wherein the plunger and the tube have been telescoped to the positions shown in Figure 2, as will be later described. The tube 11 is maintained in the position shown in Figure 1 by the pressure of the spring 37, by virtue of a washer 39, which is sprung into place on the tube 11, being tightly fitted thereto, the tube 11 being slightly ferruled so as to receive such washer, the outer forward edges of the washer contacting with the innermost forward portion of the conical internal walls of the head portion 8.

Within the compressor barrel 1 I provide a piston or movable reservoir wall, said piston or movable wall comprising, preferably, an intermediate cork piston 40, and clamping end washers 41 and 42. At 43 I show a clamping rivet having a projecting stud 45 extending forwardly of the piston or movable wall, and a rivet head portion 44, the intermediate portion being of slightly reduced diameter and passing through cylindrical alined openings in the cork piston 40 and washers 41 and 42, said openings being preferably axial relative to the bore of the barrel 1, within which bore the piston is adapted to be reciprocated.

The washer 42 is preferably cup-shaped, having cylindrical side walls 46 adapted to loosely fit within the inner walls of the barrel 1 and serving to guide the piston through the bore of the barrel, and to limit any tendency toward tilting, or so-called kipping, of the piston, which, if present, would reduce the freedom of movement otherwise had by the piston within the barrel.

The piston thus described is reciprocable within the barrel 1, but I do not provide any direct means of reciprocating such piston, such as a handle adapted to manually operate the piston, or a spring to propel such piston, nor do I provide means for supplying a positive fluid pressure from a pump or equivalent mechanism, relying, as will be later described, upon the effect of a vacuum, so-called.

In Figure 5 I have illustrated an alternative form of piston which I may employ, and which comprises merely a cup-shaped, preferably metallic piston element 47, said element carrying at the center of its bottom wall the stud 45 secured by a rivet head 44, and I provide such cup piston with outer cylindrical walls 48 of slightly less diameter than the internal walls of the barrel 1.

I find, especially, when using the compressor of my invention with grease, especially when the grease is relatively hard, that I may sometimes dispense with the cork piston 40, the grease which becomes lodged between the outer walls 48 of the cup piston and the inner walls of the barrel 1 serving as a packing to prevent air being drawn past the cup piston into the reservoir chamber 50.

Having now described the different parts of the specific embodiment of my invention herein illustrated, I will now describe the operation of the compressor when used to dispense a lubricant, such as grease, through a bearing nipple, such as the nipple 17.

Prior to the use of the compressor the reservoir chamber 50 is packed with grease by dissociating the barrel 1 from the head 6 by unscrewing the head and barrel from one another, the parts being separated at the threads 5, normally joining such parts, for the purpose of loading the barrel. In loading the barrel all of the space comprising the chamber 50 is filled with grease, and the piston or movable wall is forced by the grease to its rearmost position, wherein the piston end wall or washer 41 comes into contact with the cover 2, the air within the barrel to the rear of the piston being forced out through the orifice 51.

Also, at the same time, it is understood that the other interior chambers of the compressor, such as the chamber within the head 6 and the bridge 30, and the chamber within the tube 11, have been previously filled with grease. This is preferably done by the manufacturer of the compressor, before the compressor is put into the hands of a user, this being accomplished by the manufacturer in any suitable way, as by applying grease under pressure to the rearmost end of the head 6, and forcing it through the chamber contained within the head, through the orifices 34 and through the port 26, until the chamber within the tube 11 is also filled, and grease begins to come through the orifice 21 of the nozzle 12. This is not a necessary pre-requisite, but is preferred as permitting the instantaneous ready use of the lubricant compressor of my invention without any preliminary non-grease discharging operations by the user.

The barrel 1 and the head 6 being thus charged with grease and re-united by the screw threads 5, the operator, grasping the compressor by the handle 3, will place the spherical contact face 15 of the nozzle in contact with the rim 16 of the nipple 17, the reduced end of the nipple being guided into engagement with such contact face by the flared guide surfaces 14 extending outwardly from the spherical contact face. The operator will then press on the handle 3 forwardly towards the nipple, causing the head 6 to telescope over the tube 11, and at the same time causing the cylindrical plunger 35 to be pressed forwardly within the guide 27 of the tube 11 by the engagement of the bottom wall 32 of the bridge 30 with the rear enlarged face of such plunger. The plunger will, therefore, be advanced forwardly past the port 26 of the tube 11, closing such port and trapping lubricant contained within the tube 11 and, the operation being continued, the plunger 35 forced within the chamber 52 of the tube 11, will displace the lubricant contained within such chamber, forcibly ejecting it under great pressure past the ball valve 23—22, and through the nozzle orifice 21, such discharged lubricant entering the passage 20 of the nipple and past the ball valve 54 of the nipple to the bearing surfaces to be lubricated. A leak-proof connection is maintained between the rim 16 of the nipple contact face and the spherical contact face of the nozzle by the manual pressure exerted toward the nipple upon the handle 3.

After a charge of lubricant of a volume at least equal to the volume of space occupied by the plunger 35, disposed forwardly of the port 26, has been discharged from the compressor, the operator will release the forwardly directed pressure on the handle and the spring 37, which, during such operation, was compressed as shown in Figure 2, will cause the plunger and nozzle to regain their normal extended positions, as shown in Figure 1, the spring 37 being strong enough to accomplish this over the power of a so-called vacuum created in the chamber 52 when the plunger 35 is removed therefrom, the ball valve 22 and 23 during such removal being tightly closed.

At the moment the port 26 is again uncovered by the retractile action of the spring 37 upon the plunger 35 the power of this vacuum will be communicated to the grease within the head 6, which body of grease is continuous through the openings 34 of the bridge 30 through the chamber 50 of the barrel 1 to the piston comprising the parts 40, 41 and 42, and the entire body of grease will be drawn forwardly, together with the large piston or so-called movable wall 40—41—42, which may be herein termed a follower, as distinguished from the plunger 35 which is directly operated.

Although I have described the foregoing operation whereby the follower or movable wall is drawn forwardly in the barrel 1 after a discharging operation, by referring to the so-called vacuum as drawing the grease and piston forward so that a new charge of grease is drawn into the chamber 52 for a subsequent discharging operation of the compressor as described, I believe that another way of describing the operation relative to the re-charging of the chamber 52 would be to state that the piston follower or movable wall is pressed forward by atmospheric pressure acting on its rear side, as through the opening 51, this atmospheric pressure being in excess of the hydraulic pressure existing on the forward side of the follower when the plunger 35 has been withdrawn from the chamber 52, such withdrawal causing a consequent reduction in hydraulic pressure on the forward side of the said follower.

But in any event I find that the said follower always is in contact with the body of grease ahead of it, and forces such grease forwardly into the chamber 52 after every discharge operation, as described.

While I have shown in Figure 1 a handle 3, secured to the barrel 1, I may sometimes dispense with such handle, the operator, when using the compressor, simply grasping the barrel 1, and perhaps also the cover 2 therefor, and manipulating the compressor by using such barrel and cover as a handle, and, for an illustration of such a compressor, Figure 2, which does not shown such a handle, may be considered as not having a handle except such barrel and cover.

After a number of charges of lubricant have been expressed from the compressor, as described, the piston follower or movable wall will have been advanced forwardly step by step after each discharge operation until preferably, it finally takes the position shown in Figure 3, the stud 45 at such time projecting through the opening 33, provided for the purpose, in the bottom wall 32 and coming into contact with the flanged end 36 of the plunger 35 and causing the piston 35 to be advanced within the tube 11 until the port 26 is closed. This prevents any more grease being admitted into the chamber 52 of the nozzle-carrying tube 11 after the chamber 50 of the barrel 1 has become substantially exhausted or depleted to a predetermined degree, and I may vary the length of the stud 45 so as to vary the degree of depletion which must be attained before more lubricant is prevented from entering the chamber 52. This construction insures that the head 6 will remain charged with lubricant, and that no air pocket or any considerable degree of vacuum will be formed within the head 6 in the place of grease.

Having thus described my invention in a particular embodiment, I am aware that numerous and extensive departures may be made from the embodiment herein illustrated and described, but without departing from the spirit of my invention.

I claim:

1. A portable lubricant compressor comprising a reservoir, a movable wall therefor, the outer side of said wall being maintained under atmospheric pressure, means separate from said wall for withdrawing and ejecting lubricant from said reservoir on the inner side of said wall, said wall being moved responsive to the pressure of the atmosphere on its outer side to deliver a new charge of lubricant to said ejecting means, and means responsive to a predetermined movement of said wall to render said ejecting means ineffective.

2. A portable lubricant compressor comprising a reservoir, a discharge conduit therefor, means for ejecting charges of lubricant from said conduit, and means, responsive to a predetermined degree of depletion of lubricant in said container, to prevent the flow of a new charge of lubricant from said container to said conduit, said preventing means operating while said ejecting means is still covered with lubricant to keep the same primed.

3. A portable lubricant compressor comprising a barrel, a movable piston in the barrel, a discharge conduit leading from a lubricant containing end of said barrel, a plunger for displacing lubricant from said conduit, means to close said conduit adjacent its end after a charge of lubricant has been displaced therefrom, means for restoring said plunger and thereby causing a new charge of lubricant to be automatically forced into said conduit, the pressure of atmosphere on the side of said piston remote from the lubricant containing end of said barrel causing said piston to move within said barrel in such a direction as to reduce the lubricant cubical content of said barrel end, and means responsive to a predetermined degree of such movement to prevent restoration of the plunger.

4. A portable lubricant compressor comprising a lubricant containing reservoir, a discharge conduit therefor, a movable wall for said reservoir, one side of which is exposed to atmospheric pressure, the other side being exposed to the pressure of the lubricant in said reservoir, lubricant displacing means to eject a contained charge of lubricant in said conduit through an end thereof, means to subsequently prevent the flow of air into said conduit at its discharge end, valve means responsive to the restoration of said displacing means to put said conduit and said lubricant reservoir into communication, and a valve operating means responsive to a predetermined degree of depletion of the supply of lubricant in said reservoir to interrupt such communication.

5. A portable lubricant compressor comprising a barrel, a holder removably mounted on said barrel, a nozzle slidable in said holder, a plunger slidable in said nozzle, a wall movable independently of said holder, nozzle and plunger; said holder, nozzle and plunger being removable together as a unit, and means on said movable wall for rendering said nozzle and plunger ineffective.

6. A muzzle loading lubricant compressor comprising a cylindrical barrel, a removable casing on the muzzle end of said barrel, ejecting means housed in said casing and removable as a unit therewith, said ejecting means including telescoping members actuated by pressing said barrel forwardly towards an obstacle, and sealing means communicating with said ejecting means and forming a contact seal with a lubricant receiving part during ejection of lubricant from said compressor.

7. A lubricant compressor comprising a cylindrical barrel, a removable casing on the muzzle end of said barrel, and ejecting means housed in said casing and removable as a unit therewith, said ejecting means including telescoping members actuated by pressing said barrel forwardly towards an obstacle, said removable casing having a portion adjacent said barrel of the same diameter as said barrel, a portion of smaller diameter supporting said ejecting means, and a tapered portion joining said other portions.

8. A lubricant compressor comprising a cylindrical barrel, a removable casing on the muzzle end of said barrel, and ejecting means housed in said casing and removable as a unit therewith, said ejecting means including a sealing nozzle slidable in said casing, a plunger slidable in said nozzle, and a spring pushing forwardly on said nozzle and rearwardly on said plunger, said casing having a perforated diaphragm at the rear forming an abutment for said plunger.

9. A lubricant compressor comprising a reservoir, an imperforate movable wall therefor, the outer side of the wall being subject to atmospheric pressure only, means wholly on one side of said wall for withdrawing and ejecting, independently of said wall, material from the reservoir on the inner side of said wall, said wall being moved responsive to the pressure of the atmosphere on its outer side to deliver a new charge of lubricant to said ejecting means, and means operated by movement of said wall for rendering said ejecting means ineffective.

10. A lubricant compressor comprising a barrel, means at one end of said barrel for sucking out the contents thereof, a follower piston for moving the barrel contents into said sucking means under the influence of atmospheric pressure, and a sleeve rigid with said follower and extending axially to prevent tipping of said follower, said sleeve lying on the lubricant side of said follower and being smaller than said barrel to maintain a lubricant filled clearance space.

11. A lubricant compressor comprising a barrel, means at one end of said barrel for sucking out the contents thereof, a follower piston for moving the barrel contents into said sucking means under the influence of atmospheric pressure, and a sleeve rigid with said follower and extending axially to prevent tipping of said follower, said sleeve being smaller than said barrel.

12. A lubricant compressor comprising a housing, lubricant ejecting means operable by telescoping movement and carried by said housing, a cylindrical cup-shaped container, having an unrestricted mouth, threaded to said housing in axial alignment with said ejecting means, and a rigid handle mounted on said container for carrying and operating said compressor.

13. A hand lubricant compressor comprising a cylindrical barrel, having a muzzle end and a breech end, a rigid handle fastened to said barrel intermediate the ends thereof and extending laterally at a slight inclination toward the breech end of said barrel, ejecting means in said compressor operated by pushing the muzzle end toward an obstacle, and means for opening the muzzle end of said compressor to refill it.

14. A lubricant compressor comprising a lubricant containing barrel having an open end and a closed end, lubricant ejecting apparatus in communication with said barrel, an enclosing container for said apparatus, connecting means to join the open barrel end to said container, and a free follower in said barrel, said barrel and follower being removable as a unit from said apparatus container for lubricant loading purposes, said apparatus comprising a lubricant charge holding chamber, and a plunger manually telescopable therein, said plunger and follower being substantially in axial alignment.

15. A lubricant compressor comprising a lubricant containing barrel having an open end and a closed end, lubricant ejecting apparatus in communication with said barrel, an enclosing container for said apparatus, connecting means to join the open barrel end to said container, and a free follower in said barrel, said barrel and follower being removable as a unit from said apparatus container for lubricant loading purposes, said apparatus comprising a lubricant charge holding chamber, and a plunger manually telescopable therein, said plunger and follower being substantially in axial alignment, said barrel having rigidly secured handle means thereon to receive a forward thrust for telescoping said plunger in said chamber.

16. A lubricant compressor comprising a lubricant containing barrel having a closed end and an open end, lubricant ejecting apparatus in communication with said barrel, an enclosing container for said apparatus, connecting means to join the open barrel end to the container, a free follower in said barrel, said barrel and follower being removable as a unit from said apparatus container for lubricant loading purposes, said apparatus comprising a lubricant charge holding chamber, and a plunger manually telescopable therein, said plunger and follower being substantially in axial alignment, said plunger telescoping within said chamber when the discharge end of said chamber is brought into contact with a bearing lubricant receptacle, and manual pressure is directed upon the barrel toward said receptacle 17. A lubricant compressor comprising a lubricant containing barrel having a closed end and an open end, lubricant ejecting apparatus in communication with said barrel, an enclosing container for said apparatus, connecting means to join the open barrel end to the container, and a free follower in said barrel, said barrel and follower being removable as a unit from said apparatus container for lubricant loading purposes, said apparatus comprising a lubricant charge holding chamber, and a plunger manually telescopable therein, said charge holding chamber and said barrel being relatively telescopable.

18. A lubricant compressor comprising a container, a compressing means for ejecting the contents thereof, a follower in said container, and follower actuated means for rendering said compressing means ineffective.

19. A lubricant compressor comprising ported conveying means for delivering lubricant, and mechanism for forcing lubricant into and through said conveying means, said mechanism including means for keeping said port permanently closed when the lubricant in the compressor is depleted to a certain point.

20. Lubricating means comprising a delivery conduit having an inlet opening, forwarding mechanism including movable piston means and a non-return check valve at the discharge end of said conduit for delivering lubricant to said conduit and forcing it through and out of the same, said movable piston means sealing said inlet opening when the supply therefor is depleted to the extent that air might enter, said piston means comprising two different pistons, a high pressure compressing piston controlling said opening and a follower piston, and contact means connecting said follower and high pressure piston at the end of the stroke of the former to hold the latter over the opening.

21. Lubricating means comprising a delivery conduit having an inlet opening, forwarding mechanism including movable piston means and a non-return check valve at the discharge end of said conduit for delivering lubricant to said conduit and forcing it through and out of the same, and means for causing said movable piston means to keep said inlet opening sealed when the supply therefor is depleted to the extent that air might enter.

22. Lubricating means comprising a delivery conduit having an inlet opening, forwarding mechanism including movable piston means and a non-return check valve for delivering lubricant to said conduit and forcing it through and out of the same, and means for causing said movable piston means to keep said inlet opening sealed when the supply therefor is depleted to the extent that air might enter.

23. A portable lubricant compressor comprising a barrel, a holder removably mounted thereon, a sealing nozzle slidable in said holder, and a piston slidable in said nozzle and guided thereby.

24. A portable lubricant compressor comprising a barrel, a holder removably mounted on said barrel, a sealing nozzle slidable in said holder, a piston slidable in said nozzle, and a wall movable independently of said holder, nozzle and piston; said holder, nozzle and piston being removable together as a unit.

In witness whereof, I hereunto affix my signature this 27th day of July, 1923.

OSCAR ZERK.